Feb. 13, 1934.   M. B. BEHRMAN   1,947,181
SHEARING DEVICE FOR LOOMS AND BLADES THEREFOR
Filed May 15, 1930
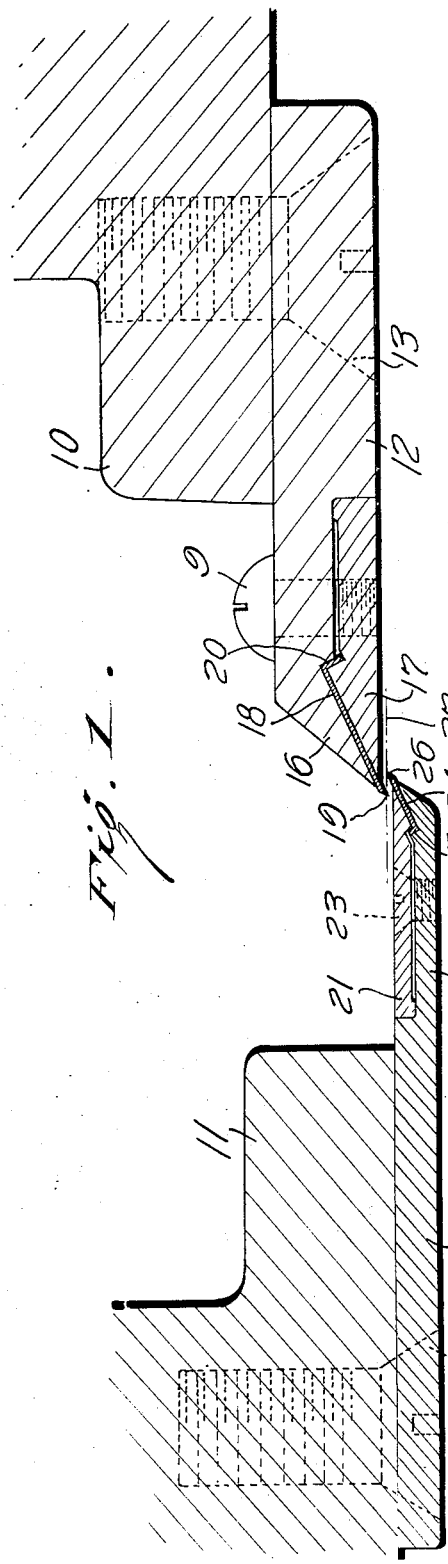
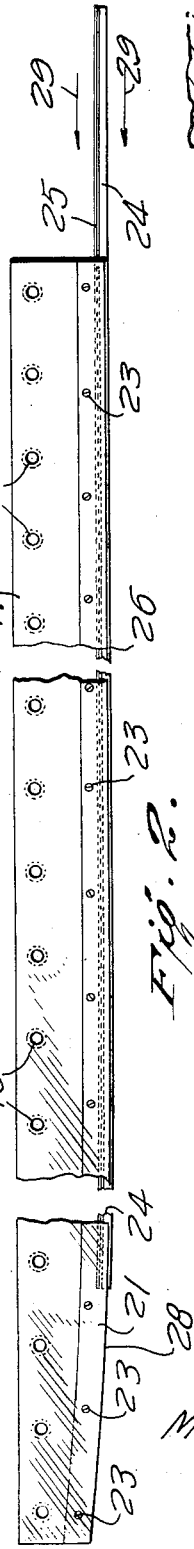
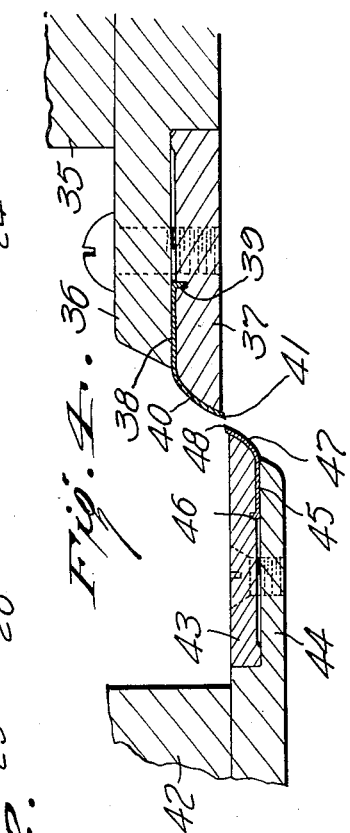
Inventor
MARCUS B. BEHRMAN,
By William S Gluet
Attorney Patented Feb. 13, 1934

1,947,181

UNITED STATES PATENT OFFICE 1,947,181

SHEARING DEVICE FOR LOOMS AND BLADES THEREFOR

Marcus B. Behrman, Brooklyn, N. Y., assignor to The Lox Seal Corporation, New York, N. Y., a corporation of New York Application May 15, 1930. Serial No. 452,559

18 Claims. (Cl. 164—34)

My present invention relates generally to shearing devices, and has particular reference to Axminster looms and the shearing devices associated therewith.

Although I have illustrated and shall hereinafter describe my invention as applied to the shearing device of an Axminster loom, nevertheless it will be understood that as to certain phases of my invention it is not limited to such a specific application or machine.

The shearing device to which my invention has particular reference is that which functions at predetermined times to cut or shear the pile threads or pile material which has been associated with the woven base of the fabric being manufactured. For example, during the weaving, mechanism may be controlled and operated to insert various pile threads into engaged relationship with the warp and weft of the fabric. In one type of loom, the pile threads are thus caused to engage at the bottom with the woven fabric and are held in an upstanding condition preparatory to the cutting thereof. Thereupon, a shearing device of the present character functions to bring two shearing members into cooperative relationship to sever the pile threads at a predetermined distance above the woven material.

In an Axminster loom, the shearing members above mentioned are relatively large and heavy, being in most cases at least three (3) feet in length and in other cases as long as sixteen (16) feet. Usually, one of the members advances from an inoperative to an operative position, and the other member is then advanced into shearing relationship and is then given an arcuate movement which causes the two shearing edges to cooperate. The last-mentioned member is usually provided with a cutting or shearing edge which conforms to a predetermined curve, such curvature being desirable for the purpose of achieving an efficient shearing operation.

The size and bulkiness of the shearing members presents serious difficulties in connection with the resharpening thereof. To provide a cutting edge, the members must be of hardened steel or the like; and for resharpening purposes each member, whether it be three (3) feet or sixteen (16) feet in length, must be totally removed from the loom and ultimately reinstalled. The resharpening operation is thus expensive and requires a considerable amount of time and labor. In reinstalling a sharpened member, tedious readjustments are necessary for purposes of re-achieving the proper alignment.

One of the main objects of my present invention is to obviate the foregoing disadvantages and to permit of the replacement of the cutting edges from time to time without any cumbersome manipulation, or removal, or adjustment of bulky or heavy portions of the machine.

One of the features of my invention lies in providing a removable cutter or blade for shearing members of the foregoing character, and means permitting ready and easy insertion and removal of such blades in properly aligned and clamped relationship.

In providing for a removable cutter or blade, one of the principal difficulties to be overcome has been caused by the curvature of the shearing member, hereinbefore referred to. That is, the shearing edge of one of the members has a gradual curvature of a predetermined character and the application and removal of a separate blade element into conformity with such an edge is a matter which would under ordinary circumstances be extremely difficult and unfeasible.

I have found, however, that by the employment of a wafer-type blade, i. e., one having an extremely small thickness, and by providing such a wafer-type blade with an extremely small width and an extremely great length, the foregoing difficulties can be overcome. Thus, I have ascertained that a wafer-type blade of sufficient length and sufficiently small width and thickness can be caused to flex practically in its own plane. Accordingly, I am enabled to provide and successfully employ a wafer-type blade of the foregoing character having a normally straight cutting edge. By properly clamping such blade into association with the shearing member having the predetermined curvature, the blade can be made to conform to the desired curvature despite the fact that its cutting edge is normally disposed along a perfectly straight line.

Further objects of my invention lie in the provision of means for suitably utilizing the foregoing features of a wafer-type blade of extreme length. One feature of my invention lies in providing a novel type of clamping arrangement whereby such a wafer-type blade or cutter may be efficiently held in proper, desired position, and may at the same time be readily removable and replaceable.

A particular feature of my invention lies in providing a guide which parallels the shearing edge; and in providing a wafer-type blade of extreme length, having an attachment or guiding edge which cooperates with the guide to flex and hold the blade in its desired relationship to the shearing member.

In one form of my invention, I provide the guide in the form of a groove or slot; and I provide the wafer-type blade with an enlarged attachment edge which cooperates with such groove.

For the attainment of the foregoing objects and such other objects as may hereinafter appear or be pointed out, I have constructed a device embodying the features of my invention and illustrated in the accompanying drawing, in which—

Figure 1 is a cross-sectional view through the operative edges of two shearing members of the character to which my invention relates;

Figure 2 is a plan view of one of said shearing members, showing the manner in which a blade or cutter of the present character may be associated therewith;

Figure 3 is a view of a shearing member showing a modification; and

Figure 4 is a view similar to Figure 1, showing a further modification.

In Figure 1, I have shown in a general way the relationship of two shearing members of the present character. 10 represents the body portion of one thereof, and 11 the body portion of the other. For illustrative purposes, I have shown a portion 12 attached to the body portion 10 by means of studs or bolts 13 or the like; and I have shown a similar portion 14 attached to the body portion 11 by means of studs 15 or the like. The member 10 may be assumed to be the one which moves from a normal inoperative position at the right of Figure 1 to the operative position shown in Figure 1, at which predetermined position it is held stationary. The member 11 may be assumed to move from a normally inoperative position at the left of Figure 1 into the operative position approximately depicted in Figure 1.

In accordance with my present invention, I provide a groove or slot at the shearing or operative edge of each shearing member, which groove is adapted to receive a removable wafer-type blade or cutter of the present character. I have provided the groove in the member 12 by splitting the operative edge of the member 12 into two complementary jaw portions 16 and 17. These portions are adapted to be clamped into the relationship of Figure 1 by means of studs, 9, or similar adjustable clamping members. When thus clamped, a longitudinal slot is provided in the shearing member between the jaws 16 and 17, this slot opening onto the operative or shearing edge of the member 12.

The main portion of the slot extends obliquely up toward the right, as viewed in Figure 1, and is adapted to receive the body portion of a wafer-type blade 18, so that the cutting edge 19 of the blade projects slightly from the open edge of the slot.

At the rear or inner edge of the slot, I provide an enlargement arranged substantially transverse with respect to the plane of the slot. In the form of Figure 1, this enlargement takes the form of an angular slot extending downwardly toward the right, and this enlarged rear portion of the slot is adapted to receive the similarly enlarged attachment edge 20 of the blade 18.

I have shown the member 14 split in a similar manner into two complementary jaw portions 21 and 22 adapted to be held in the clamped relationship of Figure 1 by means of studs 23 or the like. These jaw portions are so constructed that they will also provide a slot and a rear enlargement thereof adapted to receive the body portion of a wafer-type blade 24 and a rear enlarged attachment edge 25. The slot of the member 14 extends upwardly toward the right, as viewed in Figure 1, and the parts are so proportioned that the blade 24 will have its operative or cutting edge 26 projecting slightly from the open edge of the slot.

The fabric which is being woven lies beneath the members 10 and 11, and the pile threads which are to be cut extend upwardly therefrom. During the shearing operation, the operative or cutting edges 26 and 19 are caused to cooperate along the shearing plane represented by the dot-and-dash line 27, thus shearing the pile threads very much in the same manner as though they were cut by a very large pair of shears or scissors.

When it is desired to remove the blades 18 or 24 for purposes of replacement, it is merely necessary to release the fastening elements 9 and 23 by slight amounts, these elements being arranged at spaced longitudinal intervals along the entire length of their respective shearing members. When thus released, the jaw portions 16 and 17, and the jaw portions 21 and 22, are permitted to spread by slight amounts, whereby each cutter or blade may be withdrawn endwise from its corresponding slot. The replacement procedure is equally simple, the new blade being inserted endwise and the elements 9 and 23 being then readjusted to clamp the blades in position.

In Figure 2, I have shown in a general way how the blade 24 would be inserted into its corresponding slot. The top jaw portion 21 may be clearly identified, and the manner in which it is held in position will also be clear upon viewing the spaced studs or clamping elements 23. I draw particular attention to the left portion of Figure 2, wherein the gradual predetermined curvature of the operative edge 28 is clearly indicated. In Figure 2, it will be understood that the studs 23 have been slightly released, and that the blade 24 is in process of being inserted endwise into its slot by moving it in the general direction of the arrows 29. In this connection, it must be borne in mind that the longitudinal length of the shearing member shown may be anything from three (3) to sixteen (16) feet, or even longer. The wafer-type blade 24 is, however, extremely thin and has a width in the nature of one-half (½) an inch. I have found that a wafer-type blade of such extreme length, as compared with its thickness and width, lends itself readily to the flexing which the curvature at 28 necessitates.

It is to be noted that the enlarged attachment portion or flange 25 of the blade engages within the rear enlarged portion of the slot; and since this enlarged rear portion of the slot parallels the operative edge 28 throughout the length of the shearing member, the blade is effectually guided into its proper position. This guidance of the blade causes the same to flex practically in its own plane, with the result that the cutting edge 26 projects by a slight yet predetermined proper amount from the open edge of the slot after the blade has been fully inserted. In other words, even though the blade 24 has a cutting edge which is normally straight, the cutting edge which projects from the shearing member after the blade has been fully inserted is arranged along a predetermined gradual curve which conforms accurately to the curvature of the shearing member itself.

In Figure 3, I have shown a modification of the member 14, wherein I have again provided two complementary jaw portions 30 and 31 held together in adjustable relationship by means of studs 32 or the like. The slot is in this case, however, provided with a rear enlargement which differs slightly from the enlargement shown in Figure 1. In Figure 3, the slot is enlarged in both transverse directions so that its cross-section, as viewed in Figure 3, is substantially circular. The blade in this case has a main body portion 33 and a rear attachment edge 34 in the nature of a bead which fits into the enlarged inner edge of the slot.

The numerous variations of the configuration of the rear attachment edge of the blade and of the corresponding rear edge of the slot will be clear from the modification illustrated in Figure 3, and I do not mean to limit myself to any particular manner of providing such means for engaging and guiding the rear or inoperative edge of the elongated blade.

In Figure 4, I have illustrated a further modification, wherein the body portion of each blade has a cross-section conforming to a curve. This precludes the use in the slotted shearing member of a blade having a perfectly plane body portion.

More particularly, I have shown a shearing member 35 having the complementary jaw portions 36 and 37, the latter being so constructed as to provide a longitudinal groove adapted to receive the plane portion 38 of a blade as well as the rear attachment portion 39 thereof. The forward surface of the jaw 37 is slightly convex in transverse cross-section, and the blade has a forward portion 40 which conforms to this outer surface and terminates in a cutting edge 41 arranged along the shearing plane.

In a similar way, the complementary shearing member 42 is provided with the jaw portions 43 and 44 which provide a slot adapted to receive a complementary wafer-type blade having the plane portion 45, the rear attachment edge 46, the curved forward portion 47, and the operative edge 48.

It will be understood that although I have shown the members 12 and 14 attached to the body portions 10 and 11, respectively, these members are, in effect, integral portions of the shearing members themselves. Furthermore, although I have shown the jaw portions as entire separable one from the other it will be understood that this construction is optional and that, if desired, the slot for receiving the wafer-type blade may be provided by other methods of splitting the shearing members.

Furthermore, it will be understood that my invention is not restricted to the arrangement of a rear attachment edge on each blade; nor to the provision of a guiding groove or the like in the shearing member. It may, for example, be possible to insert and remove a wafer-type blade of entirely plane character by simply clamping it in position by any suitable means without necessarily inserting it endwise into the shearing member.

The great advantages of my present construction will be obvious from the description given. Not only is the cumbersome and expensive removal of the shearing members unnecessary, but they need not be constructed of heavy or hardened steel; nor need any readjustments be made when the cutting edges are replaced. Each wafer-type blade may be inserted and removed with great facility and may, if desired, be resharpened or may be entirely discarded. Where the blades are resharpened, the operation of the loom need not be impeded, since it is a comparatively simple matter to remove one blade and replace it by another.

One of the most important features of my invention lies in the employment of a wafer-type blade having extremely small thickness and width in comparison with its length, this type of blade lending itself to the customary curvature herein referred to and thereby permitting the advantages of ready replacement to be resorted to.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In a shearing device for looms, a pair of complementary shearing members, at least one of said members having a slot therein, and a flexible, wafer-type blade removably applicable into said slot so that its cutting edge projects therefrom.

2. In a shearing device for looms, a pair of complementary elongated shearing members, at least one of said members having a slot therein, an elongated flexible, wafer-type blade removably applicable into said slot, and means for clamping the blade in position with its cutting edge projecting from said slot.

3. In a shearing device for looms, a pair of complementary shearing members, at least one thereof having an elongated slot therein at its operative edge, an elongated flexible wafer-type blade removably applicable into said slot, said blade having a front cutting edge and a rear attachment edge, and means at the rear of said slot for engaging the rear attachment edge of the blade to hold the blade in position with its cutting edge projecting by a predetermined amount from the front of said slot.

4. In a shearing device for looms, a pair of complementary shearing members, at least one thereof having a slot therein at its operative edge, the front of said slot being open and the rear of said slot having an enlargement arranged transversely to the plane of said slot, and a flexible wafer-type blade removably applicable into said slot, said blade having a front cutting edge adapted to project out of the front of said slot, and a rear attachment edge enlarged in a transverse direction with respect to the plane of the blade and adapted to engage within said enlargement at the rear of the slot.

5. In a shearing device for looms, a pair of complementary shearing members, at least one of said members having a slot therein at its operative edge, the front of said slot being open and the rear of said slot having a portion arranged at an angle to the plane of said slot, whereby a blade having a transverse cross-section conforming substantially to the transverse cross-section of said slot may be removably inserted edgewise into said slot.

6. In a shearing device for looms, a pair of complementary shearing members, at least one thereof having a slot therein at its operative edge, the front of said slot being open and the rear of said slot having a portion arranged at an angle to the plane of said slot, and a flexible wafer-type blade removably insertable edgewise into said slot, said blade having a front cutting edge adapted to project forwardly out of said slot, and a rear angular portion adapted to engage snugly within the rear angular portion of said slot.

7. In a shearing device of the character described, an elongated blade holder having a curved operative longitudinal edge and provided with blade engaging means paralleling said edge, whereby a flexible blade engaged with said means can have its cutting edge curved in the plane of the blade into conformity with said edge.

8. In a shearing device of the character described, an elongated blade holder presenting a longitudinally extending curved terminal edge and having a longitudinally extending portion inwardly of said edge curved so as to parallel said terminal edge, whereby a blade conforming to said portion will be curved in the plane of the blade into conformity with said terminal edge.

9. In a shearing device of the character described, a pair of complementary elongated blade holders, at least one of which comprises two superposed clamping members having portions of their clamping surfaces similarly inclined so as to provide therebetween a blade receiving space extending longitudinally through said blade holder and open at one end thereof, and a groove opening into and extending longitudinally of said space whereby an elongated blade can be guided into and out of said space by engagement of a blade portion in said groove during an endwise movement of the blade.

10. In a shearing device of the character described, an elongated blade holder having an operative longitudinal edge, and a longitudinally extending groove inwardly of said edge with a portion thereof curved with reference to the longitudinal axis of the holder, whereby a flexible blade received in and moved along said groove can be given a corresponding curvature.

11. In a shearing device for looms, a shearing member of elongated nature adapted to carry a cutting blade and having an operative, curved, longitudinal edge, said member being provided with a longitudinal slot adjacent and substantially parallel to said edge and co-extensive in length therewith.

12. In a shearing device for looms, a shearing member of elongated nature and having an operative, curved, longitudinal edge, said member being provided with a longitudinal slot adjacent and substantially parallel to said edge and coextensive in length therewith, and an elongated, wafer-type blade removably insertable into said slot; said blade having a normally straight cutting edge, and having a width so small with respect to its length that the blade may be made to flex substantially in its own plane to conform its cutting edge with said curved operative edge.

13. In a shearing device of the character described, an elongated shearing member having an operative, curved, longitudinal edge, said member being provided with a longitudinal slot adjacent and substantially parallel to said edge and coextensive in length therewith, said slot having a uniform transverse cross-section with an enlargement at the inner or rear end of the slot, and an elongated, wafer-type blade having a normally straight cutting edge and a uniform transverse cross-section conforming to the cross-section of said slot, whereby the blade may be removably inserted endwise into said slot; said blade having a width so small with respect to its length that the engagement of the blade with said enlargement will cause the blade to flex substantially in its own plane to conform said cutting edge with said curved operative edge of said shearing member.

14. In a shearing device of the character described, an elongated shearing member having an operative curved, longitudinal edge, said member being provided with a longitudinal slot adjacent and substantially parallel to said edge and coextensive in length therewith, an elongated, wafer-type blade removably insertable endwise into said slot, and means for securing said blade in position with its cutting edge projecting from said slot and in conformity with said curved operative edge.

15. A wafer-type blade for a shearing device of the character described, said blade having a cutting edge and a length parallel to said edge so great with respect to the width and thickness of said blade, that the blade may be flexed but always remain substantially in its original plane to cause the edge to curve in the plane of the blade relatively to its normal position without however giving it a permanent set.

16. A wafer-type blade for a shearing device of the character described, said blade having a normally straight cutting edge and a length parallel to said edge so great with respect to the width and thickness of the blade that the blade may be flexed but always remain substantially in its original plane to conform said cutting edge to a gradual curve without however giving it a permanent set.

17. A wafer-type blade for a shearing device of the character described, said blade having a cutting edge and a length parallel to said edge so great with respect to the width and thickness of said blade, that the blade may be flexed but always remain substantially in its original plane to conform said cutting edge to a gradual curve in the plane of the blade without however giving the blade a permanent set, and means on said blade for cooperation with a holder for giving the blade and edge such curvature.

18. A wafer-type blade for a shearing device of the character described, said blade having a normally straight cutting edge and an opposite or rear edge parallel thereto, the rear edge being enlarged in a direction transverse to the plane of the blade, the length of said blade parallel to the cutting edge being so great with respect to its width and thickness that the blade may be flexed substantially in its own plane to conform said cutting edge to a gradual curve without however giving the blade a permanent set, whereby guidance of said rear enlarged edge along and into a gradual curve will flex said cutting edge into a parallel curvature.

MARCUS B. BEHRMAN.